US007809837B2

(12) United States Patent
Allamaraju et al.

(10) Patent No.: US 7,809,837 B2
(45) Date of Patent: Oct. 5, 2010

(54) USER INTERFACE FOR CONFIGURING WEB SERVICES FOR REMOTE PORTLETS

(75) Inventors: Subbu Allamaraju, Longmont, CO (US); Alexander Toussaint, Broomfield, CO (US)

(73) Assignee: Bea Systems, Inc., Redwood Shores, CA (US)

( * ) Notice: Subject to any disclaimer, the term of this patent is extended or adjusted under 35 U.S.C. 154(b) by 944 days.

(21) Appl. No.: 10/969,091

(22) Filed: Oct. 20, 2004

(65) Prior Publication Data
US 2006/0085520 A1    Apr. 20, 2006

(51) Int. Cl.
*G06F 15/16* (2006.01)
(52) U.S. Cl. ........................ 709/227; 709/218
(58) Field of Classification Search ............... 709/227, 709/218
See application file for complete search history.

(56) References Cited

U.S. PATENT DOCUMENTS 7,370,276 B2    5/2008  Willis
2002/0091836 A1* 7/2002  Moetteli ..................... 709/227
2003/0055868 A1    3/2003  Fletcher et al.
2004/0003096 A1    1/2004  Willis
2004/0003097 A1* 1/2004  Willis et al. ................. 709/228
2004/0210658 A1* 10/2004  Guillermo et al. ........... 709/227
2005/0027869 A1    2/2005  Johnson
2005/0198196 A1* 9/2005  Bohn et al. ................. 709/217

OTHER PUBLICATIONS

"Web Services for Remote Portlets Specification", Kropp et al., Approved as an OASIS Standard Aug. 2003.*
Kropp et al., "Web Services for Remote Portlets Specification," Aug. 2003, Oasis, pp. 1-86.

* cited by examiner

*Primary Examiner*—George C Neurauter, Jr.
*Assistant Examiner*—Mark D. Fearer
(74) *Attorney, Agent, or Firm*—Fliesler Meyer LLP

(57) ABSTRACT

A web services system enables web servers to serve pages that utilize remote portlets. A consumer system serves pages that utilize remote portlets stored on one or more producer systems. An improved user interface enables a user to select a portlet from a page on a producer system and drag the portlet to a page on a consumer system. This action causes configuration information for the portlet to be transferred to the consumer system, which can then utilize the portlet as a remote portlet. When a user accesses a page utilizing a remote portlet, the consumer system contacts the producer system, obtains content for the page and presents the page to the user.

33 Claims, 8 Drawing Sheets

USER INTERFACE FOR CONFIGURING WEB SERVICES FOR REMOTE PORTLETS

INCORPORATION BY REFERENCE

The present invention incorporates by reference in its entirety the Web Services for Remote Portlets standard version 1.0, by the OASIS Group, available at http://www.oasis-open.org.

CROSS-REFERENCE TO RELATED APPLICATION

The present application relates to U.S. patent application Ser. No. 10/969,598, filed Oct. 20, 2004, entitled MESSAGE INTERFACE FOR CONFIGURING WEB SERVICES FOR REMOTE PORTLETS, inventors Subbu Allamaraju and Alexander Toussaint.

FIELD OF THE INVENTION

The present invention relates broadly to the delivery of web portal content. The present invention relates more particularly to systems, methods, and computer readable media for implementing the delivery of portal services from producer systems to consumer systems.

BACKGROUND OF THE INVENTION

Since its inception in 1995, the Java programming language has become increasingly popular. Java, which is an interpreted language, enabled the creation of applications which could be run on a wide variety of platforms. This ability to function across a variety of different client platforms and Java's relatively easy implementation of network applications has resulted in its use in endeavors as basic as personal webpages to endeavors as complex as large business-to-business enterprise systems.

As Java has become more commonplace, a wide variety of tools and development platforms have been created to assist developers in the creation and implementation of Java applications and portals, which provide a way to aggregate content and integrate applications, allowing a visitor to a Web site to access everything via a user interface.

One ongoing need has been the ability for providers of web applications to prepare functional content that can be implemented through outside sites. Often providers will wish to offer web services without setting up the front-end interface elements that are necessary to implement the web services.

The Web Services for Remote Portlets (WSRP) standard by the OASIS group has enabled the delivery of functional applications from producer sites to consumer sites. However, the implementation of WSRP has presented considerable difficulties.

Additionally, current implementations of WSRP are somewhat difficult to configure. An administrator of a consumer system must obtain configuration information for a portlet and a producer and a submit the information to a configuration utility. Doing so often requires a prohibitively high level of expertise for a user of a consumer system. What is needed is an improved interface for configuring consumer systems to utilize remote portlets.

DETAILED DESCRIPTION

A web services system enables web servers to serve pages that utilize remote portlets. A consumer system serves pages that utilize remote portlets stored on one or more producer systems. An improved user interface enables a user to select a portlet from a page on a producer system and drag the portlet to a page on a consumer system. This action causes configuration information for the portlet to be transferred to the consumer system, which can then utilize the portlet as a remote portlet. When a user accesses a page utilizing a remote portlet, the consumer system contacts the producer system, obtains content for the page and presents the page to the user.

Figure 1:
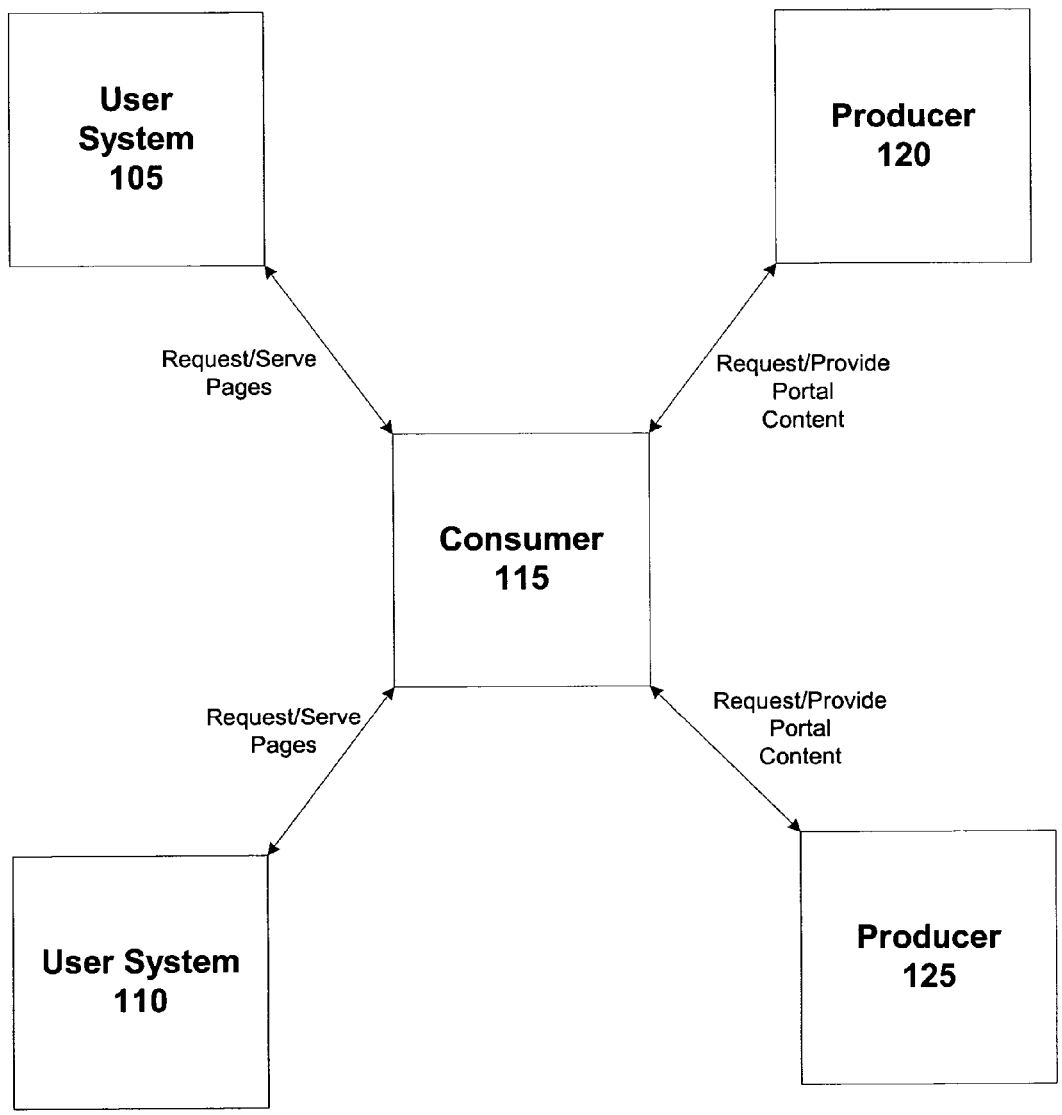
FIG. 1 is a block diagram illustrating an overview of the interaction between a consumer system, user systems, and producer systems in accordance with one embodiment of the present invention.

FIG. 1 illustrates an overview of the interaction between a consumer system, user systems, and producer systems. Producer systems 120, 125 can store one or more portlet applications that are utilized by user systems 105, 110 through a consumer system 115. In some embodiments, the producer systems can maintain web portals. In alternate embodiments, the producer systems perform other functions or merely serve to provide access to portlets. The user systems 105, 110 are systems remote to the consumer 115 that are utilized by end users and include web page viewing capabilities.

The consumer 115 is a network accessible system that serves web pages, content, and applications to other parties. The consumer 115 can serve its own content in addition to content stored on the producers 120, 125. The consumer 115 presents a web interface to the user systems that utilizes applications stored both locally and on the producers 120, 125. The consumer serves pages that utilize remote portlets on the producers through proxy portlets and allow the consumer to utilize the remote portlets' functionality. The proxy portlets are references to remote portlets that are stored within the web pages on the consumer that cause the portlets to appear within the consumer web pages.

During a registration phase, the consumer 115 registers with a producer 120. In one embodiment, the producer 120 identifies each consumer with a unique handle that enables the producer 120 to identify what portlets are available to a particular consumer. In some embodiments, the consumer does not register with the producer 120. The producer can provide a service description to the consumer 115 that indicates properties of the producer 120 and lists the available portlets that are stored on the producer 120. During a description phase, the producer 115 also provides a Web Services Description Language (WSDL) file indicating data types and message protocols to be used for interacting with the producer 120. This process is described in greater detail with respect to FIG. 2.

When a user system 105 establishes contact with the consumer 115, the consumer aggregates pages, and stores proxy portlets in the pages that access remote portlets on the producer 120. The user system 105 can send a page request to the consumer 115 for a page that includes remote portlets that utilize the producer. When such a request is received by the consumer 115 from the user system 105, the consumer 115 sends a request for the data that appears in the page to the producer 120. The producer 120 returns the data, which the consumer integrates into a single user interface and presents to the end user system 105.

Figure 2:
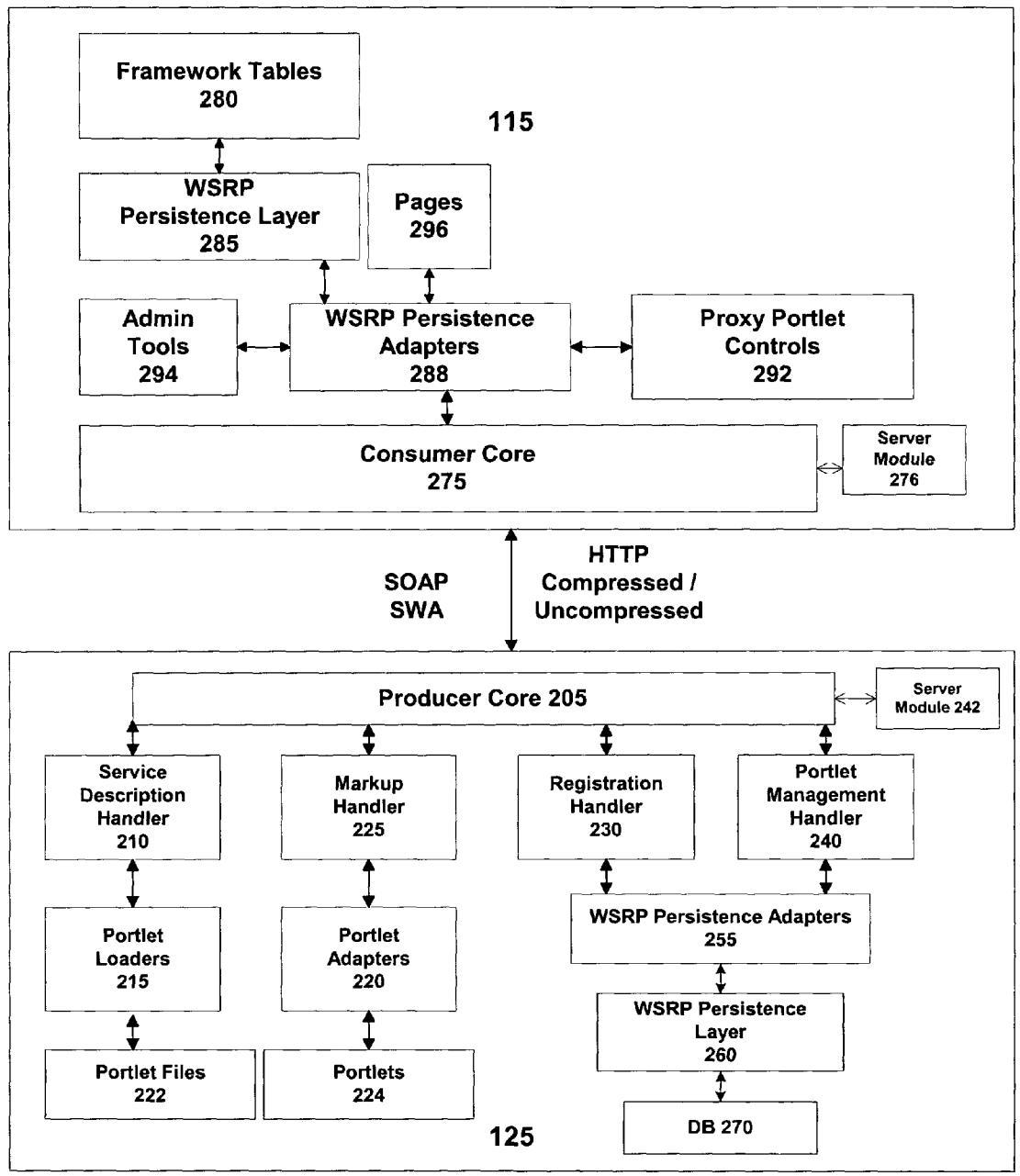
FIG. 2 is a block diagram illustrating a more detailed view of a consumer and a producer in accordance with one embodiment of the present invention.

FIG. 2 is a block diagram illustrating a more detailed view of a consumer 115 and a producer 125 in accordance with one embodiment of the present invention. The producer 125 includes a producer core 205, a service description handler 210, portlet loaders 215, portlet adapters 220, portlet files 222, a markup handler 225, a registration handler 230, a portlet management handler 240, WSRP persistence adapters 255, persistence layers 265, one or more portlets 224, a server module 242, and a database (DB) 270.

The producer core 205 is an application such as a servlet that is configured to reside on the producer and communicates with the consumer 115. The producer core 205 generates the WSDL files that indicate the parameters of communication between the producer 125 and the consumer 115 and transmits a file to the consumer 115 or otherwise provides the parameters to the consumer. These parameters can include data types and messaging protocols and can be preconfigured or user-selected.

The producer 205 additionally includes a service description handler 210. The service description handler 210 is responsible for providing a listing of portlets 224 that are available to consumers. The service description handler utilizes the portlet loaders 215 to load the portlet files 222. The portlet files 222, which define the available portlets, are either portlet files or files created from a deployment descriptor such as a portlet.xml file. In some embodiments, the portlet loaders 215 include separate loaders for different types of portlets such as Java Page Flow (JPF) portlets, Struts portlets, Java Specification Request (JSR) 168 base portlets, and Java portlets. Struts portlets are portlets that utilize the Struts framework layer from the Apache Software Foundation. JPF portlets are portlets that utilize Page Flows to separate interface content from navigation control and other functional logic. In some embodiments, the JPF portlets on the producer can support nested page flows. Nested page flows are page flows that can be utilized temporarily without discarding a currently executing page flow. While the above portlets types are used as examples throughout this application, it should be understood that any portlet type is supported.

The service description handler 210, through the producer core returns to the consumer 115 a list of available portlets in the form of an array of PortletDefinition classes or some other format. The PortletDefinition classes include a portletHandle identifier that identifies the portlet and modes, states, MIME types, a title, and a description for each portlet. Other information can also be provided.

A registration handler 270 registers consumers with the producer 125 so that the consumers can access portlets on the producer 125. The registration process entails the consumer 115 providing certain predetermined identification information to the producer 125. In some embodiments, the producer does not register the consumer. The consumer registration information can be stored in the database 270 through the persistence adapters 255 and persistence layer 265.

The portlet management handler 240 is responsible for storing, modifying, and retrieving portlet preferences and modifying or deleting portlets. The WSRP persistence adapters 255 are configured to receive requests to generate, modify, and read information stored in the database 270 from the registration handler 230 and portlet management handler 240. In one embodiment, the WSRP persistence adapters 255 include separate adapters for the registration handler 230 and the portlet management handler 240. The persistence layer 260 manages access to the database by representing data in the database as objects, and allows particular data types to be accessed as such without requiring that the accessing entity have any knowledge about how said data is stored in the database. When a request to modify data, such as modifying the registration information of a consumer is received from the registration handler 230 through its persistence adapter 255, the persistence layer 265 receives the request in the form of an object modification request. The persistence layer 265 locates the various instances in the database associated with the registration information and modifies them appropriately.

The markup handler 225 is responsible for processing markup requests for the portlets 224 (requests for the visual representation of the portlets within the page). When a request from a user system is received at the consumer, for example, a page is loaded that utilizes a remote portlet, the consumer 115 requests the appropriate render data from the producer. This request includes an identity of the portlet and a listing of capabilities of the user system. The markup handler 225 receives this request and determines an appropriate portlet adapter 220 to access the referenced portlet. The portlet adapters 220 are adapters that enable portlets 224 to be accessed as remote portlets. The portlet adapters can include portlet adapters for multiple portlet types, such as JPF, Java, JSR168, and Struts portlets. In some embodiments, a portlet adapter can comprise a Java ARchive (JAR) file that is inserted into a producer to enable it to interact with remote consumers in a manner similar to how the portlet would interact with a local portal.

A server module 242 generates an user interface layer that enables a user selecting a portlet on a displayed page on a producer portal to obtain configuration information for utilizing the portlet as a remote portlet. This information can be obtained by selecting the portlet with a mouse, dragging the portlet to an email window or web browser window, or through some other means such as a voice interface or touchscreen. In some embodiments, the server module 242 performs other portal display/management functions as well.

The consumer 115 includes a consumer core 275 which manages communication with the producer 125, one or more persistence adapters 288, administration tools 294, proxy portlet controls 292, a WSRP persistence layer 285, one or more pages 296 that reference the remote portlets 224 through included proxy portlets, a server module 276, and framework tables 280.

The consumer core 275 communicates with the producer core 205 using the Simple Object Access Protocol (SOAP) or another suitable protocol. In some embodiments, the consumer and producer cores use a variant of SOAP, known as SOAP With Attachments (SWA) that enables binary files to be attached to SOAP messages. In some embodiments, the producer and consumer use HyperText Transport Protocol (HTTP) compression to reduce the size of transmitted data. The consumer core 275 receives a WSDL file from the producer 125 that it uses to configure its interaction with the producer 125. While in the present embodiment a file is used, in alternate embodiments, the configuration information can be provided in a different manner.

The framework tables 280 store information about the portlets available on the producer 125 and other portlets, that is received from the service handler 210 of the producers. This information can include identifying information for the portlets, identifying information for the producer 125, capacities of the producer 125, and the types of functionality provided by the portlets. The framework table 280 also can include information about instances of proxy portlets stored on the consumer 115. When a portlet is first identified during registration/discovery a proxy portlet control 292 is created for the proxy that can be used to configure how the proxy is utilized on the consumer side.

A set of administration tools 294 enable a user or administrator of the consumer to create web pages 296 that access the remote portlets on the producer. The administrative tools insert a proxy portlet associated with a remote portlet on the producer into a created page 296 in a location that would normally refer to a portlet local to the consumer.

A server module 276 generates a user interface layer which enables a user selecting a section on one of the pages 296 to receive configuration information for utilizing a portlet on the producer 125 as a remote portlet. This information can be obtained by selecting a portlet 125 on the producer with a mouse and dragging the portlet to one of the pages 296 or through some other means such as a voice interface, touchscreen interface, or custom means. In some embodiments, the server module 276 performs other portal display/management functions as well.

A persistence layer 285 enables the admin tools and the proxy portlet controls 292 to store information about proxy portlet instances, including configuration information through their respective persistence adapters 288. This information can be retrieved, created, or modified by submitting actions to be performed on data objects to the persistence layer 285. The persistence layer receives the actions, locates the data corresponding to the objects on the framework tables 280 and retrieves and/or modifies the tables accordingly.

When a user system attempts to render a page 296 on the consumer that includes one of the remote portlets 224, the consumer transmits a GetMarkup request to the producer 125 to obtain the rendered content that should appear in the page. The request includes a handle for the portlet and capabilities of the client on the user system 105. The producer 125 utilizes one of the portlet adapters 220 to obtain the rendered content for the page from the portlet and returns the content to the consumer 115, which renders the page.

If a user system initiates an interaction with a page utilizing a remote portlet, for example by submitting a form, the consumer 115 sends to the producer the handle for the portlet, the form data storing the information stored on the form, query data indicating a requested response from the portlet, and any uploaded information. The producer 125 utilizes one of the portlet adapters 220 to submit this information to the portlet as if it had been submitted locally to the portlet. The portlet processes the request and changes its current mode/window state in response. The mode/window state indicates a state/mode for the window displaying the portlet, such as minimized, maximized, hidden, or normal.

The producer then returns to the consumer the new window state and a new navigational state for the portlet indicating a new page to be rendered on the main page on the consumer 115. When the consumer 115 subsequently requests markup, this new page, which presumably includes the response to the submitted form, is displayed inside the viewed portal page on the consumer.

In various embodiments, the producer system 125 utilizes templates for various types of Uniform Resource Locators (URLs). The templates include embedded fields for different types of information to be provided by the producer or consumer. When URLs are passed between the producer and the consumer, they may be rewritten by the consumer or producer to reflect differences in how the URLs would be accessed from either system. For example, URL designed to be utilized by the producer might not include the domain of the producer and would only include a location in a local file system. The consumer could rewrite such a URL with a global address that included the domain of the producer. Alternately, when the consumer submits a markup or other page request to the producer, it embeds blank fields into the URL for information such as markup state, window state, interaction state, and other information. The producer then rewrites the URL with this information included.

In some embodiments, page flow portlets and struts portlets can interact directly with a user system rather than working through the consumer. As mentioned above, the producer can utilize a URL writing framework based on templates. When portlets are interacting directly with a user, one set of templates is used. When portlets interact through a consumer a separate set of templates are used. For example, when a portlet is being accessed directly by a user, a template is used that does not require rewriting by the consumer.

Figure 3:
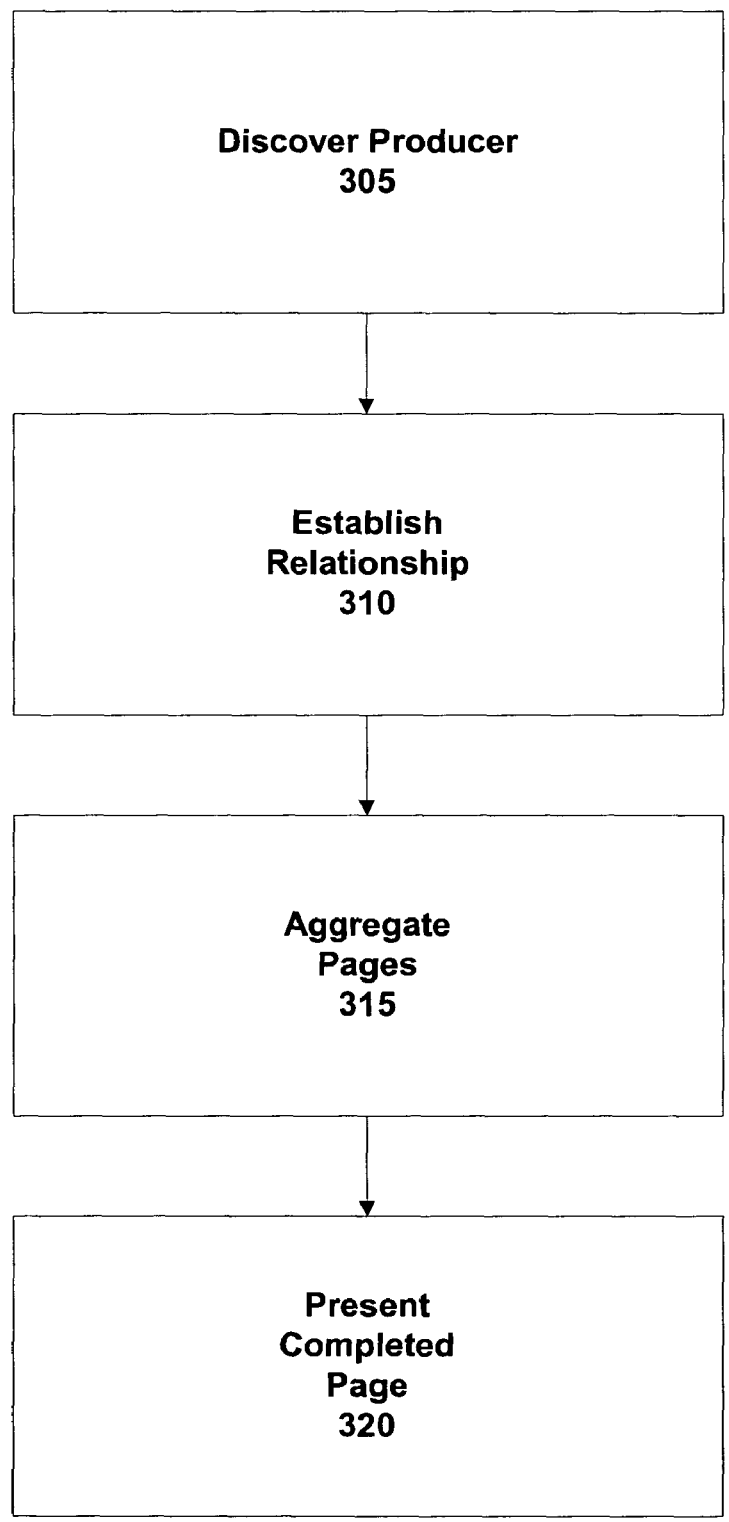
FIG. 3 is a flow chart illustrating one embodiment of a process for implementing a remote portlet.

FIG. 3 is a flow chart illustrating one embodiment of a process for implementing a remote portlet. In step 305, the consumer discovers a producer that provides remote portlets to consumer. This discovery can occur at the initiation of the consumer 115 or the producer 125. In some embodiments, pages on the producer system can indicate that its portlets are available for use. In step 310, the consumer establishes a relationship with the producer. This entails the consumer registering and providing identification information to the producer and the producer providing a listing of available portlets and the functions performed by the portlets. In some embodiments, the producer 125 does not require registration by the consumer 115.

In step 315, an administrator of the consumer aggregates pages that utilize remote portlets on the producer. This step can be performed by inserting code referencing the remote portlets into web pages. In an alternate embodiment, the consumer system is a host site that enables non-administrators to design web content and the pages are aggregated by a user of the host site.

In step 320 the completed page is presented to an end user. The consumer sends a request for markup to the producer 125, which returns the rendered content to the consumer, which then integrates the rendered content into a completed page.

Figure 4:
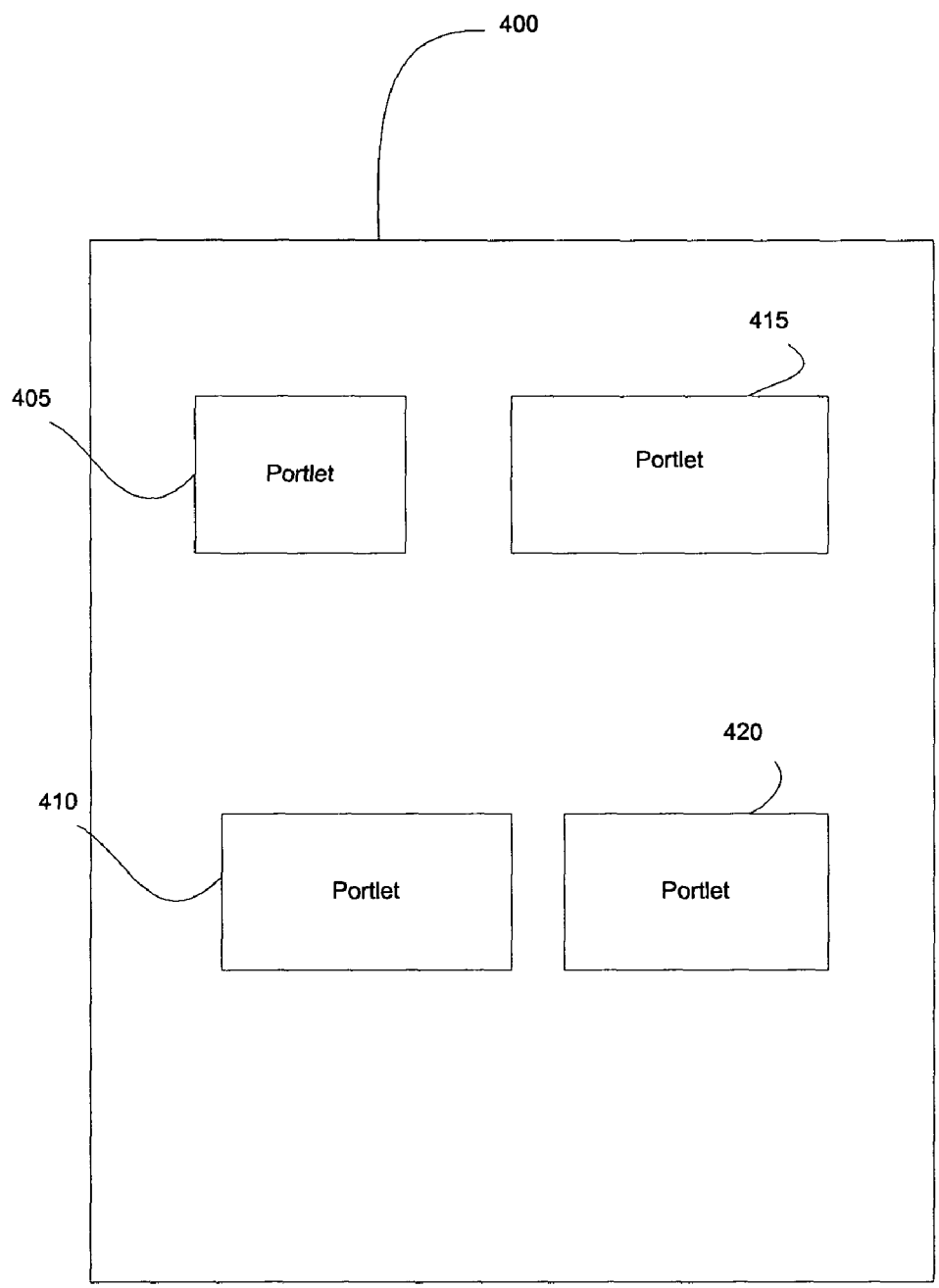
FIG. 4 illustrates one embodiment of a user interface for viewing portlets on a producer system.

FIG. 4 illustrates one embodiment of a user interface for viewing portlets on a producer system. The interface includes a page 400 on a web portal maintained on the producer system 125. The page displays one or more portlets 405, 410, 415, 420. In one embodiment, the page is a catalog page that has been created to provide access to portlets for utilization by other parties. For example, a corporation might permit different departments or divisions to create individual web pages for the users. A central IT facility could provide the page 400 so that the individual divisions could use the portlets 405, 410, 415, 420 in their pages. Alternately, an internet service such as Yahoo! that permits its users to construct personal web pages could offer access to the page to its users.

In alternate embodiments, the page is stored on a functional portal. In such embodiments, the portlets 405, 410, 415, 420 provide information and other services for visiting users, while still remaining available for utilization by consumer systems. While in the present embodiment, the page is stored on the producer system 125 of FIG. 1, in alternate embodiments, it can be stored on different systems.

The page 400 is configured to provide information for utilizing the portlet 415 as a remote portlet by selecting the portlet with a mouse or other pointing device. In some embodiments, a user can click on a portlet 415 and either through a menu or other mechanism, receive configuration information for enabling a consumer to utilize the portlet 415 as a remote portlet.

Figure 5:
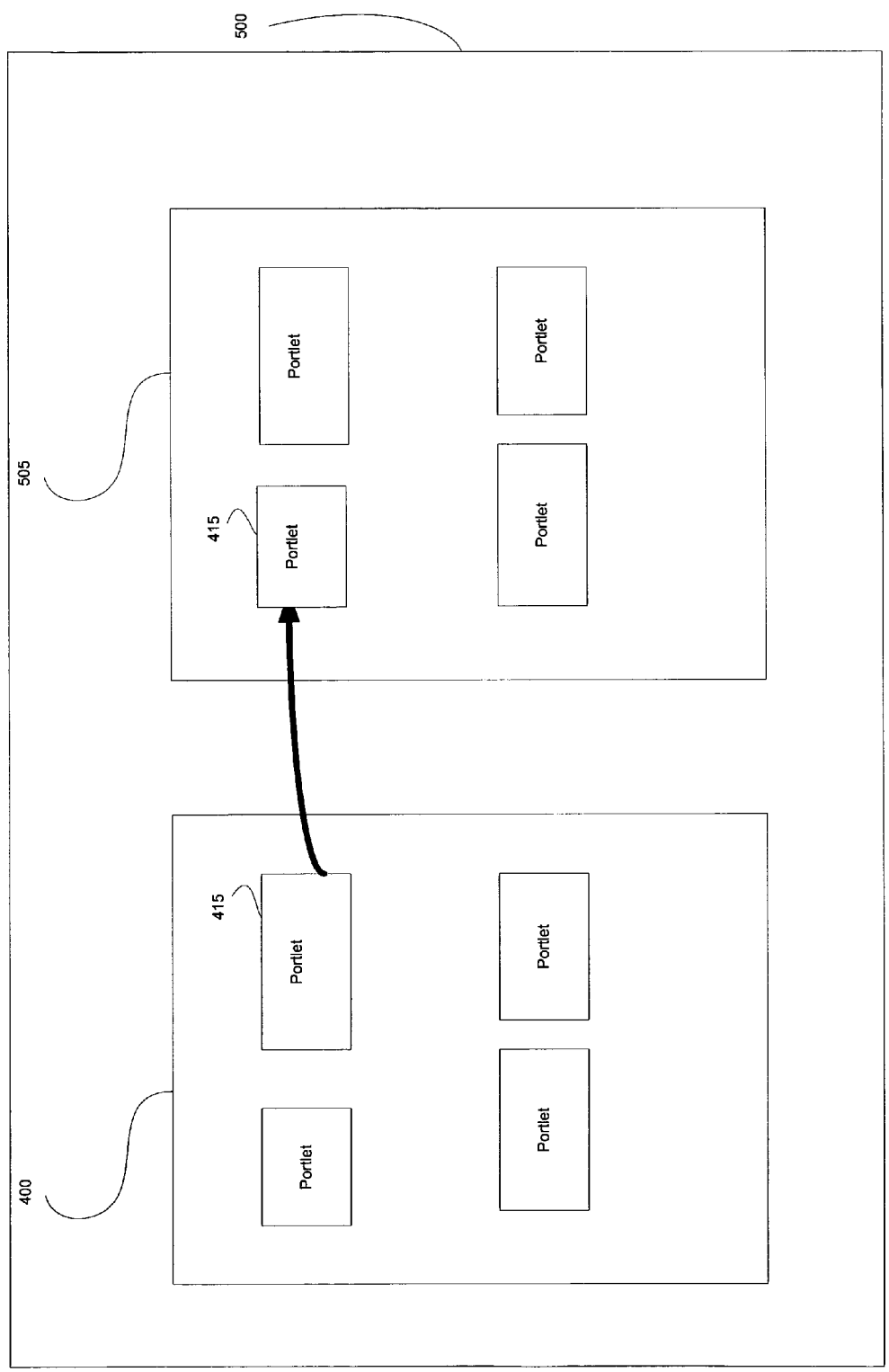
FIG. 5 illustrates one embodiment of a user interface for configuring a consumer system to utilize a portlet on a producer system.

FIG. 5 illustrates one embodiment of an interface for configuring a consumer system to utilize a portlet on a producer system. In the present embodiment, a user interface 500 displays a browser window showing the producer page 400 of FIG. 4 and a browser window showing a page 505 on the consumer system 115. In some embodiments, the interface 500 is a desktop on a conventional user system 105. In alternate embodiments, the interface 500 is generated on a special terminal for configuring portals.

The page 505 on the consumer system also includes one or more portlets that are utilized by users interacting with the consumer system 115. The portlets can be local portlets stored on the consumer 115 or remote portlets stored on a producer system.

A user can add remote portlets to the page 505 by selecting a portlet 415 with a mouse or other pointing device and dragging the portlet 415 to a location on the consumer page. Alternately, a keyboard, voice interface, touchscreen, or any other manner of user interface can be used. This action causes the portlet 415 to appear on the page 515 on the consumer system 115 as a remote portlet.

When this action is initiated, the server module 242 on the producer 125 passes configuration information for the portlet to the desktop 500. The information is then passed to the server module 276 on the consumer system 115, which accepts the configuration information. The configuration information preferably includes an identifier for the producer system and an identifier for the portlet. The consumer system 115 uses this information to configure itself to utilize the portlet 415 as a remote portlet and to display the portlet on the page 505, preferably at the location to which the portlet was dragged.

In alternate embodiments, this transfer can be performed by selecting the portlet on the producer page 400, selecting a transfer or copy option from a popup or pull-down menu and then selecting a location on the consumer page 505.

Figure 6:
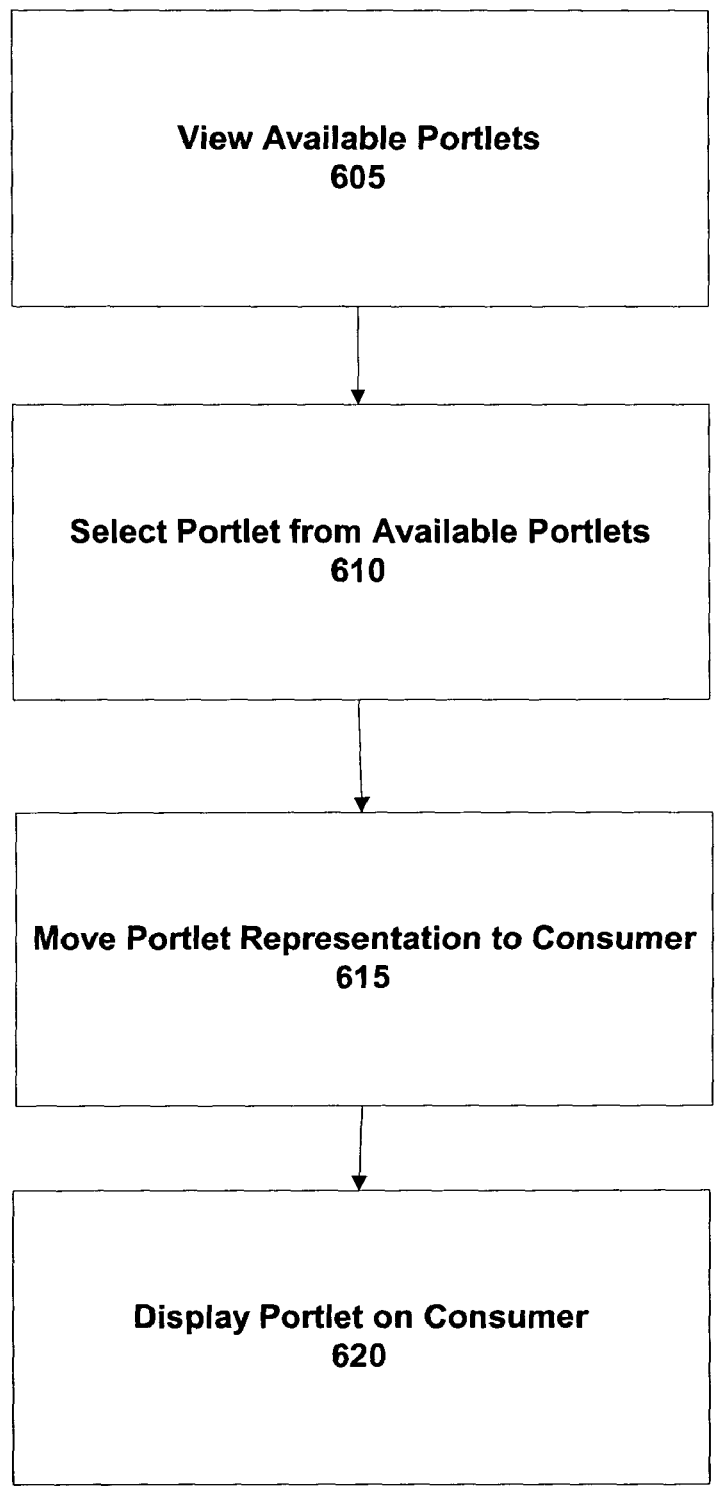
FIG. 6 is a flow chart illustrating a process for configuring a consumer system to utilize a remote portlet.

FIG. 6 is a flow chart illustrating a process for configuring a consumer system to utilize a remote portlet. In one embodiment, this process is performed by a user of an administrative system that is used to configure the consumer 115. In step 605 a page displaying available portlets is viewed. In one embodiment, the page is a dedicated catalog of portlets that are configured for access by others, in an alternate embodiment, the page is a page on a functional web portal. In some embodiments, authentication information must first be submitted to the producer system for the page to be viewed.

In step 610 a portlet is selected from the available portlets. While in the present embodiment, the portlet is selected using a mouse or other pointing device, in other embodiments, devices such as keyboards, voice-recognition systems or touchscreens can be used to select the portlet. This step entails receiving information from the producer system for configuring the portlet to be utilized as a remote portlet. This information can include an identifier for the producer displaying the portlet and an identifier for the portlet. In some embodiments the information is provided in the form of an eXtensible Markup Language file.

In step 615 a portlet or portlet representation is moved to the consumer system by moving the portlet to a browser window displaying the page on the consumer system. While in the present embodiment, the portlet is selected using a mouse or other pointing device, in other embodiments, devices such as keyboards, voice-recognition systems or touchscreens can be used to select the portlet. This step entails providing the consumer system with the information received from the producer for configuring the portlet to be utilized as a remote portlet. In some embodiments, authentication information must be provided to the consumer before this manner of information can be submitted to the consumer 115 through a drag and drop interface. As described above, the portlet information can be transmitted to the consumer 115 through alternate interface mechanisms, such as the use of popup or pull-down menus on both pages or additional means.

In step 620, the updated page on the consumer 115 is displayed. A representation of the portlet is displayed on the page on the consumer system. In one embodiment, the portlet representation is displayed at a location where it was dragged on the consumer page. In an alternate embodiment, the portlet appears at a default location.

Figure 7:
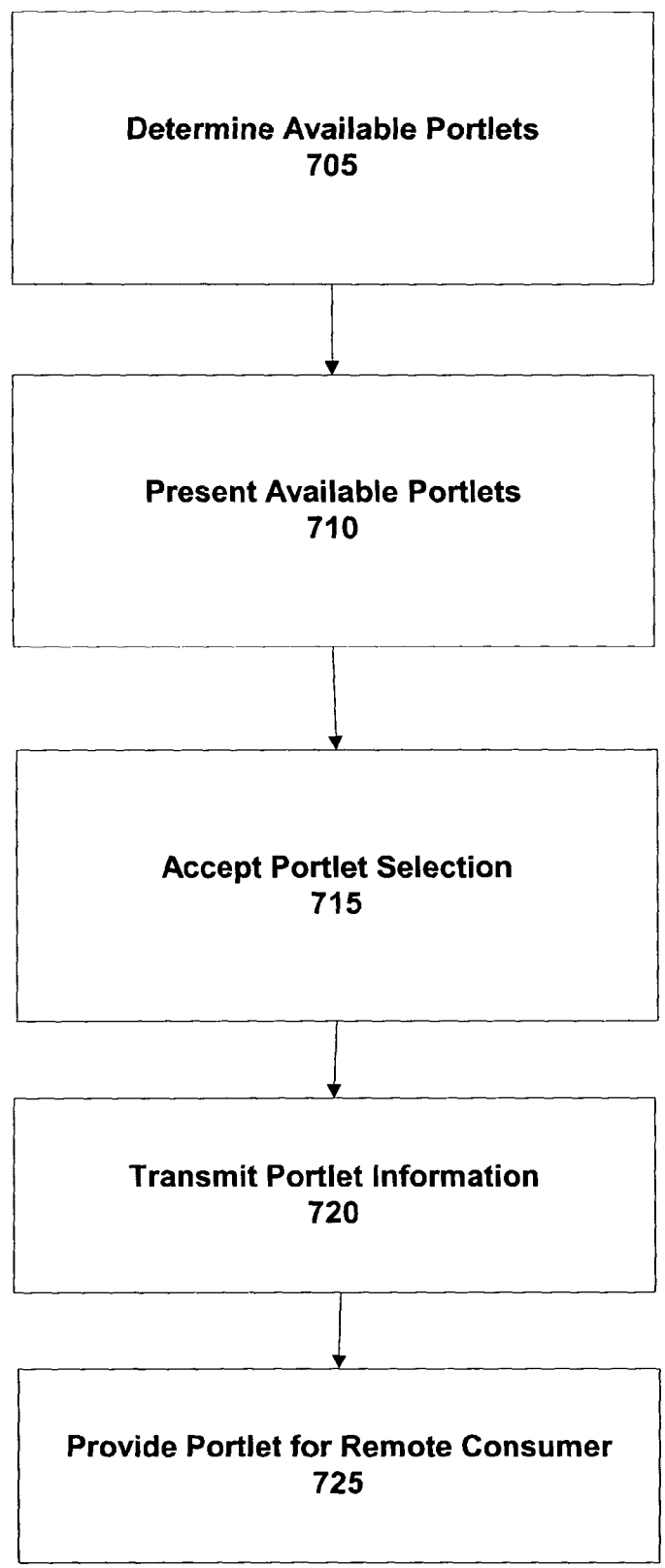
FIG. 7 is a flow chart illustrating a process performed by a producer system to enable a remote consumer to access portlets on the producer.

FIG. 7 is a flow chart illustrating a process performed by a producer system to enable a remote consumer to access portlets on the producer. The process described below can be performed by a WSRP producer that serves as a dedicated portlet catalog or by a functioning portal that also enables remote access to its portlets. In step 705 the producer system determines available portlets for the purpose of presenting them on a catalog page. In some embodiments, a page is then generated dynamically. In alternate embodiments, the portlets that appear on a page are predetermined and configured with the page and no determination step is performed.

In step 710 the producer system displays the available portlets on a page. The portlets can be arranged according to certain types of classifications, with portlets performing certain functions, or relating to certain types of data, grouped together.

In some embodiments, a user must submit authentication information before viewing the displayed portlets. In alternate embodiments, no authentication information is needed if the system viewing the page is in an authorized domain or has an authorized Internet Protocol (IP) address. In further embodiments, the page can be viewed from any system without authentication.

In step 715 a portlet selection is accepted. The portlet selection can be performed through a pointing device or some other mechanism. The selection can include dragging a portlet representation to another browser window or selecting it and then choosing an action item from a menu. In response to the selection, the producer system provides, in step 720, configuration information for the remote portlet.

In step 725 the producer serves the portlet for use by the consumer system on a consumer page. When a user attempts to view the modified page on the consumer system, the producer provides markup and interaction information for the consumer. This process is performed in the manner described in FIG. 2 and FIG. 3. The producer system may require that the consumer system perform a registration process before the portlet can be utilized by the page on the consumer system.

Figure 8:
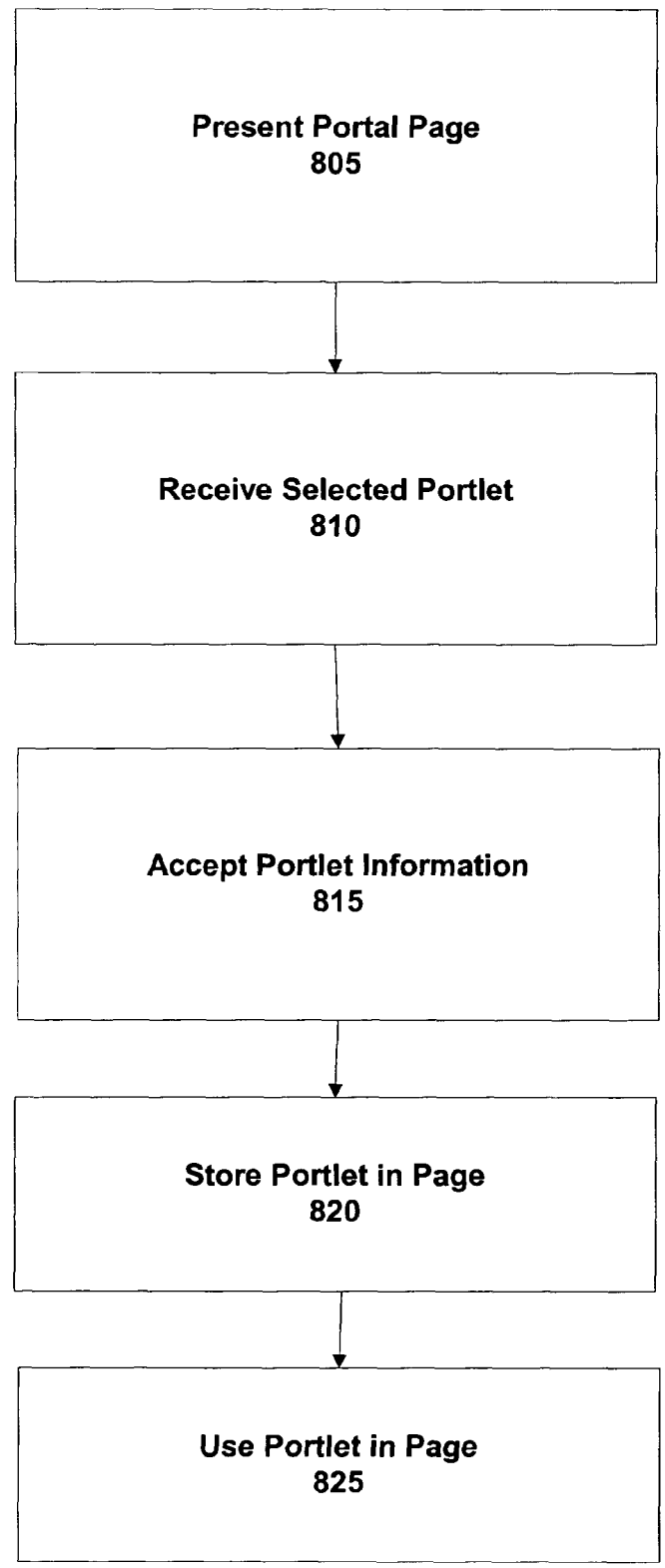
FIG. 8 is a flow chart illustrating a process for integrating and utilizing a portlet stored on a remote producer system.

FIG. 8 is a flow chart illustrating a process for integrating and utilizing a portlet stored on a remote producer system. In step 805 the consumer system presents a page within a locally stored portal. In some embodiments, the page includes one or more local and/or remote portlets. In some embodiments, a user must submit authentication information before viewing the displayed page on the consumer system. In alternate embodiments, no authentication information is needed if the system viewing the page is in an authorized domain or has an authorized Internet Protocol (IP) address. In further embodiments, the page can be viewed from any system without authentication.

In step 810 an interface component generated by the consumer accepts a submission of a portlet representation. This step can be initiated by dragging a representation of the portlet to the browser window displaying the consumer page, or by utilizing a menu item on the consumer after previously selecting a portlet. While in the present embodiment, the portlet is dragged using a mouse or other pointing device, in other embodiments, devices such as keyboards, voice-recognition systems or touchscreens can be used to move the portlet In step 815 the consumer system accepts the configuration information. The configuration information preferably includes an identifier for the portlet and the producer system. In step 820 the consumer system stores a reference to the remote portlet in the selected page. This reference causes the remote portlet to be utilized when the page is next accessed. In some embodiments, the consumer system configures the page so that the portlet is displayed in the section of the page in which the representation was placed in step 810.

In step 825 the portlet is utilized in the page. When a user next views the page, a markup request is submitted to the producer system and the page, including the returned markup is displayed, as described in FIG. 2 and FIG. 3.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a non-transitory computer readable storage medium (media) having instructions stored thereon/in which can be used to program a computer to perform any of the processes of the present invention. The non-transitory computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the non-transitory computer readable storage medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method in a producer system for enabling access to local portlets for remote consumers, the method comprising:
storing a plurality of portlets on a producer system, wherein the portlets are configured to be utilized by pages on remote consumer systems;
presenting, in a first browser window in a graphical user interface on a user system, a producer page which includes graphical representations of the plurality of portlets;
providing a remote consumer system that is operable to present, in a second browser window in the graphical user interface on the user system, a consumer page that includes graphical representations of one or more portlets available for use at the remote consumer system;
receiving a selection of a portlet on the producer page, wherein the selection includes dragging a graphical representation of the portlet from the producer page displayed in the first browser window to the consumer page displayed in the second browser window; and
sending, in response to receiving the selection, configuration information for the selected portlet to the user system, wherein the configuration information includes an identifier for the producer system, including an Internet Protocol (IP) address for the producer system, and an identifier for the selected portlet;
forwarding the configuration information from the user system to the remote consumer system; and
wherein the remote consumer system uses the configuration information to utilize the portlet and to display the portlet on the consumer page.

2. The method of claim 1, wherein the selection of the portlet comprises dragging a mouse pointer over a representation of the portlet.

3. The method of claim 1, wherein providing the information comprises providing an eXtensible Markup Language (XML) document.

4. The method of claim 1, wherein the portlet is a Struts portlet.

5. The method of claim 1, wherein the portlet is a page flow portlet.

6. A method in a consumer web portal for utilizing portlets stored on a remote producer, the method comprising:
maintaining a consumer page associated with the portal, the consumer page configured to deliver access to portlets, wherein the consumer page is displayed in a first browser window in a graphical user interface on a user system;
providing a remote producer system that is operable to present, in a second browser window in the graphical user interface on the user system, a producer page that includes graphical representations of a plurality of portlets stored at the remote producer system;

receiving a selection of a portlet stored on the remote producer system, wherein the selection includes dragging a graphical representation of the portlet from the producer page displayed in the second browser window and onto the consumer page displayed in the first browser window and wherein the selection specifies a location on the consumer page to which the graphical representation of the portlet was dragged, and wherein the portlet is a page flow portlet;

receiving from the user system, configuration information for the portlet in response to the selection wherein the user system is provided with the configuration information by the remote producer system; and providing access to the portlet through the consumer page in response to receiving the configuration information about the portlet.

7. The method of claim 6, wherein receiving the information about the portlet comprises receiving an eXtensible Markup Language (XML) file.

8. The method of claim 6, wherein the information about the portlet includes an identifier for the portlet and an identifier for the producer system.

9. A non-transitory computer readable storage medium having instructions stored thereon that when executed by a processor cause a system to:

store a plurality of portlets on a producer system, wherein the portlets are configured to be utilized by pages on remote consumer systems;

present, in a first browser window in a graphical user interface on a user system, a producer page which includes graphical representations of the plurality of portlets;

provide a remote consumer system that is operable to present, in a second browser window in the graphical user interface on the user system, a consumer page that includes graphical representations of one or more portlets available for use at the remote consumer system;

receive a selection of a portlet-on the producer page, wherein the selection includes dragging a graphical representation of the portlet from the producer page displayed in the first browser window to the consumer page displayed in the second browser window; and send, in response to receiving the selection, configuration information for the selected portlet to the user system, wherein the configuration information includes an identifier for the producer system, including an Internet Protocol (IP) address for the producer system, and an identifier for the selected portlet;

forward the configuration information from the user system to the remote consumer system; and wherein the remote consumer system uses the configuration information to utilize the portlet and to display the portlet on the consumer page.

10. The non-transitory computer readable storage medium of claim 9, wherein the selection of the portlet comprises dragging a mouse pointer over a representation of the portlet.

11. The non-transitory computer readable storage medium of claim 9, wherein providing the information comprises providing an eXtensible Markup Language (XML) file.

12. The non-transitory computer readable storage medium of claim 9, wherein the portlet is a struts portlet.

13. The non-transitory computer readable storage medium of claim 9, wherein the portlet is a page flow portlet.

14. A non-transitory computer readable storage medium having instructions stored thereon that when executed by a processor cause a system to:

maintain a consumer page associated with the portal, the consumer page configured to deliver access to portlets, wherein the consumer page is displayed in a first browser window in a graphical user interface on a user system;

provide a remote producer system that is operable to present, in a second browser window in the graphical user interface on the user system, a producer page that includes graphical representations of a plurality of portlets stored at the remote producer system;

receive a selection of a portlet stored on the remote producer system, wherein the selection includes dragging a graphical representation of the portlet from the producer page displayed in the second browser window and onto the consumer page displayed in the first browser window and wherein the selection specifies a location on the consumer page to which the graphical representation of the portlet was dragged, and wherein the portlet is a page flow portlet;

receive from the user system, configuration information for the portlet in response to the selection wherein the user system is provided with the configuration information by the remote producer system; and provide access to the portlet through the consumer page in response to receiving the configuration information about the portlet.

15. The non-transitory computer readable storage medium of claim 14, wherein the instructions for receiving the information about the portlet comprise instructions for receiving an eXtensible Markup Language (XML) file.

16. The non-transitory computer readable storage medium of claim 14, wherein the information about the portlet includes an identifier for the portlet and an identifier for the producer system.

17. A system in a Web Services for Remote Portlets producer, the system comprising:

a computer, including a computer readable medium and processor operating thereon;

a producer system, executing on the computer, wherein the producer system includes a plurality of portlets executed by the processor, and wherein the portlets are configured to be utilized by pages on remote consumer systems;

a producer page including the plurality of portlets, wherein the producer page is displayed in a first browser window in a graphical user interface on a user system, wherein the producer page includes graphical representations of the plurality of portlets, and wherein the graphical user interface further includes a second browser window displaying a consumer page that includes graphical representations of one or more portlets available for use at a remote consumer system;

wherein the producer system is operable to receive a selection of a portlet from the producer page, wherein the selection includes dragging a graphical representation of the portlet from the producer page displayed in the first browser window to the consumer page displayed in the second browser window; and wherein the producer is further operable to send, in response to receiving the selection, configuration information for the selected portlet to the user system, wherein the user system forwards the configuration information to the remote consumer, and wherein the remote consumer uses the configuration information to utilize the portlet and to display the portlet on the consumer page, wherein the configuration information includes an identifier for the producer system, including an Internet Protocol (IP) address for the producer system, and an identifier for the selected portlet.

18. The system of claim 17, wherein the selection of the portlet comprises dragging a mouse pointer over a representation of the portlet.

19. The system of claim 17, wherein the page, wherein providing the information provides an eXtensible Markup Language (XML) file.

20. The system of claim 17, wherein the portlet is a struts portlet.

21. The system of claim 17, wherein the portlet is a page flow portlet.

22. A system in a Web Services for Remote Portlets consumer, the system comprising:
- a computer, including a computer readable medium and processor operating thereon;
- a consumer system, executing on the computer, wherein the producer system includes a web portal;
- a consumer page associated with the web portal, the page configured to deliver access to portlets, wherein the consumer page is displayed in a first browser window in a graphical user interface on a user system, and wherein the graphical user interface further includes a second browser window displaying a producer page that includes graphical representations of a plurality of portlets stored at a remote producer system;
- wherein the consumer system is operable to receive a selection of a portlet stored on the remote producer system, wherein the selection includes dragging a graphical representation of the portlet from the producer page in the second browser window to the consumer page displayed in the first browser window, and wherein the selection specifies a location on the consumer page to which the graphical representation of the portlet was dragged, and wherein the portlet is a page flow portlet;
- wherein the consumer system is further operable to receive from the user system, configuration information about the portlet in response to the selection,
- wherein the user system is provided the configuration information by the remote producer system; and
- wherein the consumer system provides access to the portlet through the consumer page in response to receiving the configuration information about the portlet.

23. The system of claim 22, wherein the page, wherein receiving the information about the portlet, receives an eXtensible Markup Language (XML) file.

24. The system of claim 22, wherein the information about the portlet includes an identifier for the portlet and an identifier for the producer system.

25. A method in a configuration system for adding a portlet to a consumer system, the method comprising:
- displaying a first browser window in a graphical user interface, wherein the first browser window shows a producer page stored on a producer system, and wherein the producer page includes a graphical representation of a portlet;
- displaying a second browser window in the graphical user interface, wherein the second browser window shows a consumer page stored on a consumer system;
- wherein the graphical user interface enables the graphical representation of the portlet to be selected, wherein the selection includes dragging the graphical representation from the producer page in the first browser window to the consumer page in the second browser window;
- in response to the selection, receiving from the producer system, configuration information for configuring the consumer system to utilize the portlet as a remote portlet, wherein the configuration information includes an identifier for the producer system, including an Internet Protocol (IP) address for the producer system, and an identifier for the portlet; and
- transmitting the configuration information to the consumer system so that the consumer system is able to utilize the portlet as a remote portlet.

26. The method of claim 25, wherein the information comprises an eXtensible Markup Language (XML) file.

27. The method of claim 25, wherein the portlet is a struts portlet.

28. A non-transitory computer readable storage medium having instructions stored thereon that when executed by a processor cause a system to:
- display a first browser window in a graphical user interface, wherein the first browser window shows a producer page stored on a producer system, and wherein the producer page includes a graphical representation a portlet;
- display a second browser window in the graphical user interface, wherein the second browser window shows a consumer page stored on a consumer system;
- wherein the graphical user interface enables the graphical representation of the portlet to be selected, wherein the selection includes dragging the graphical representation from the producer page in the first browser window to the consumer page in the second browser window;
- in response to the selection, receive from the producer system, configuration information for configuring the consumer system to utilize the portlet as a remote portlet, wherein the configuration information includes an identifier for the producer system, including an Internet Protocol (IP) address for the producer system, and an identifier for the portlet; and
- transmit the configuration information to the consumer system so that the consumer system is able to utilize the portlet as a remote portlet.

29. The method of claim 1, wherein presenting the page further comprises determining portlets available to be presented on the page and dynamically generating the page.

30. The method of claim 1, wherein presenting the page further comprises grouping the plurality of portlets on the page according to one or more classifications.

31. A method in a consumer web portal for utilizing portlets stored on a remote producer, the method comprising:
- maintaining a consumer page associated with the portal, the consumer page configured to deliver access to portlets, wherein the consumer page is displayed in a first browser window in a graphical user interface on a user system;
- providing a remote producer system that is operable to present, in a second browser window in the graphical user interface on the user system, a producer page that includes graphical representations of a plurality of portlets stored at the remote producer system;
- receiving a selection of a portlet stored on the remote producer system, wherein the selection includes dragging a graphical representation of the portlet from the producer page displayed in the second browser window and onto the consumer page displayed in the first browser window and wherein the selection specifies a location on the consumer page to which the graphical representation of the portlet was dragged, and wherein the portlet is a struts portlet;
- receiving from the user system, configuration information for the portlet in response to the selection wherein the user system is provided with the configuration information by the remote producer system; and providing access to the portlet through the consumer page in response to receiving the configuration information about the portlet.

32. A non-transitory computer readable storage medium having instructions stored thereon that when executed by a processor cause a system to:

maintain a consumer page associated with the portal, the consumer page configured to deliver access to portlets, wherein the consumer page is displayed in a first browser window in a graphical user interface on a user system;

provide a remote producer system that is operable to present, in a second browser window in the graphical user interface on the user system, a producer page that includes graphical representations of a plurality of portlets stored at the remote producer system;

receive a selection of a portlet stored on the remote producer system, wherein the selection includes dragging a graphical representation of the portlet from the producer page displayed in the second browser window and onto the consumer page displayed in the first browser window and wherein the selection specifies a location on the consumer page to which the graphical representation of the portlet was dragged, and wherein the portlet is a struts portlet;

receive from the user system, configuration information for the portlet in response to the selection wherein the user system is provided with the configuration information by the remote producer system; and provide access to the portlet through the consumer page in response to receiving the configuration information about the portlet.

33. A system in a Web Services for Remote Portlets consumer, the system comprising:

a computer, including a computer readable medium and processor operating thereon;

a consumer system, executing on the computer, wherein the producer system includes a web portal;

a consumer page associated with the web portal, the page configured to deliver access to portlets, wherein the consumer page is displayed in a first browser window in a graphical user interface on a user system, and wherein the graphical user interface further includes a second browser window displaying a producer page that includes graphical representations of a plurality of portlets stored at a remote producer system;

wherein the consumer system is operable to receive a selection of a portlet stored on the remote producer system, wherein the selection includes dragging a graphical representation of the portlet from the producer page in the second browser window to the consumer page displayed in the first browser window, and wherein the selection specifies a location on the consumer page to which the graphical representation of the portlet was dragged, and wherein the portlet is a struts portlet;

wherein the consumer system is further operable to receive from the user system, configuration information about the portlet in response to the selection, wherein the user system is provided the configuration information by the remote producer system; and wherein the consumer system provides access to the portlet through the consumer page in response to receiving the configuration information about the portlet.

\* \* \* \* \*

UNITED STATES PATENT AND TRADEMARK OFFICE
CERTIFICATE OF CORRECTION

PATENT NO. : 7,809,837 B2  Page 1 of 1
APPLICATION NO. : 10/969091
DATED : October 5, 2010
INVENTOR(S) : Subbu Allamaraju et al.

It is certified that error appears in the above-identified patent and that said Letters Patent is hereby corrected as shown below:

In column 13, line 37, in claim 22, after "provided" insert -- with --.

In column 14, line 17, in claim 28, after "representation" insert -- of --.

In column 16, line 27, in claim 33, after "provided" insert -- with --.

Signed and Sealed this
Thirty-first Day of May, 2011

David J. Kappos
*Director of the United States Patent and Trademark Office*